US007443397B2

(12) United States Patent
Chiang

(10) Patent No.: US 7,443,397 B2
(45) Date of Patent: Oct. 28, 2008

(54) METHOD AND APPARATUS FOR NONLINEAR CODING WITH 1ST ORDER POWER FUNCTIONS IN DIGITAL IMAGING SYSTEM

(75) Inventor: Chih-Wei Chiang, Hsinying (TW)

(73) Assignee: Quanta Computer Inc., Tao Yuan Shien (TW)

( * ) Notice: Subject to any disclaimer, the term of this patent is extended or adjusted under 35 U.S.C. 154(b) by 214 days.

(21) Appl. No.: 11/387,240

(22) Filed: Mar. 22, 2006

(65) Prior Publication Data

US 2007/0002055 A1 Jan. 4, 2007

(30) Foreign Application Priority Data

Jun. 29, 2005 (TW) .............................. 94121825 A

(51) Int. Cl.
*G06T 11/20* (2006.01)

(52) U.S. Cl. ........................ 345/442; 345/443; 345/440

(58) Field of Classification Search ......... 345/440–443, 345/606, 610, 604
See application file for complete search history.

(56) References Cited

U.S. PATENT DOCUMENTS 5,471,573 A * 11/1995 Kaasila ........................ 345/441
5,706,058 A 1/1998 Okada
5,818,521 A 10/1998 Hieda
5,990,949 A 11/1999 Haruki
6,515,699 B2 * 2/2003 Tanji et al. .................. 348/254

FOREIGN PATENT DOCUMENTS

CN 1467683 A 1/2004

OTHER PUBLICATIONS

Xinhong Lin; Method for Establishing Gamma Conversion Table and Gamma Correcting Method According to the This Table; esp@cenet database; Publication No. CN1467683: Publication Date: Jan. 14, 2004; http://v3.espacenet.com.

* cited by examiner

*Primary Examiner*—Kee M. Tung
*Assistant Examiner*—Hau H Nguyen
(74) *Attorney, Agent, or Firm*—Reed Smith LLP; Stanley P. Fisher, Esq.; Juan Carlos A. Marquez, Esq.

(57) ABSTRACT

This invention discloses a transforming apparatus, according to a transforming curve, for transforming a first image to a second image. The first image includes a plurality of pixels. The transforming apparatus includes a differentiating module, a first transforming module, an adjusting module and a second transforming module. According a predetermined value, the differentiating module transforms the transforming curve into a plurality of sub-curves. The first transforming module generates a plurality of straight lines corresponding to the sub-curves. According to the sub-curves, the straight lines and a predetermined threshold, the adjusting module adjusts the straight lines to generate a plurality of approximate lines. According to the approximate lines and the pixels of the first image, the second transforming module generates the second image.

8 Claims, 6 Drawing Sheets

METHOD AND APPARATUS FOR NONLINEAR CODING WITH 1ST ORDER POWER FUNCTIONS IN DIGITAL IMAGING SYSTEM

BACKGROUND OF THE INVENTION

1. Field of the Invention

The invention relates to a transforming apparatus, and more particularly to a transforming apparatus used for transforming a first image into a second image.

2. Description of the Prior Art

Gamma correction (GC) is served as CRT response calibration initially to adjust the overall brightness of an image displayed on screen. Images that are not properly corrected may look either pale or too dark. On the other hand, gamma correction models human perceptual response quite well. In modern applications, people implement GC to enhance contrast experience for the latter purpose.

In the past, people implemented GC in hardware by look-up tables (LUTs). While accuracy can be obtained, the needed memory space is an issue. For n-bit image data, it costs $n*2^{n+1}$ bits of memory for the transformation of single gamma coefficient, which may occupy a large area in a chip. The situation can be worse if the transformation of multiple gamma coefficients is to be supported. U.S. Pat. No. 5,706,058 tried to divide the whole LUT into two smaller sub-LUTs. Though the needed memory space was lowered down, this method was only suitable for the transformation of single gamma coefficient. U.S. Pat. No. 5,990,949 tried to match LUTs for preview and snapshot modes, which in turn needed one more LUT to accomplish their goals. Similarly, the fundamental architecture of U.S. Pat. No. 5,990,949 was designed for the transformation of single gamma coefficient.

If the transformation of multiple gamma coefficients needs to be supported, the memory space increases monotonically. Therefore, it is desirable to implement gamma correction in pure combinational circuits. The representative patent that implemented GC in combinational circuits is U.S. Pat. No. 5,818,521, which divided the whole gamma curve into 2 to 5 sections. Each section was then approximated by 2nd-order power functions. Furthermore, the number of multipliers and adders can be optimized through careful architecture design.

However, multipliers are inevitable in U.S. Pat. No. 5,818,521, since it is essential for 2nd-order power functions. Since multipliers are still too large for compact design, it is necessary to use shift-and-add combinational circuits to implement the computational GC.

Accordingly, the invention proposes a transforming apparatus that the gamma curve is divided into several sections, which are approximated by 1st-order power function. Meanwhile, multipliers are replaced with shifting operations to compute the power function, simplifying the whole architecture design and resulting in less hardware cost.

SUMMARY OF THE INVENTION

The scope of the invention is to provide a transforming apparatus for transforming a first image into a second image according to a transforming curve.

According to a transforming curve, the transforming apparatus of the invention is used for transforming a first image into a second image, wherein the first image includes a plurality of pixels, and the transforming apparatus includes a differentiating module, a first transforming module, an adjusting module and a second transforming module. The differentiating module, according to a predetermined value, is used for transforming the transforming curve into a plurality of sub-curves. The first transforming module is used for generating a plurality of straight lines corresponding to the sub-curves. According to the sub-curves, the straight lines and a predetermined threshold, the adjusting module is used for adjusting the straight lines to generate a plurality of approximate lines. According to the approximate lines and the pixels of the first image, the second transforming module is used for generating the second image.

According to the aforementioned apparatus and method thereof, the invention can adjust $2^{nd}$-order curve into $1^{st}$-order line and further utilize the lines to transform one image into another. The $2^{nd}$-order calculation circuit has to be performed by multipliers, but the invention just only needs simple shifters and adders to perform $1^{st}$-order calculation. Therefore, the calculation time is saved, the circuit architecture is simpler, and the cost is reduced.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
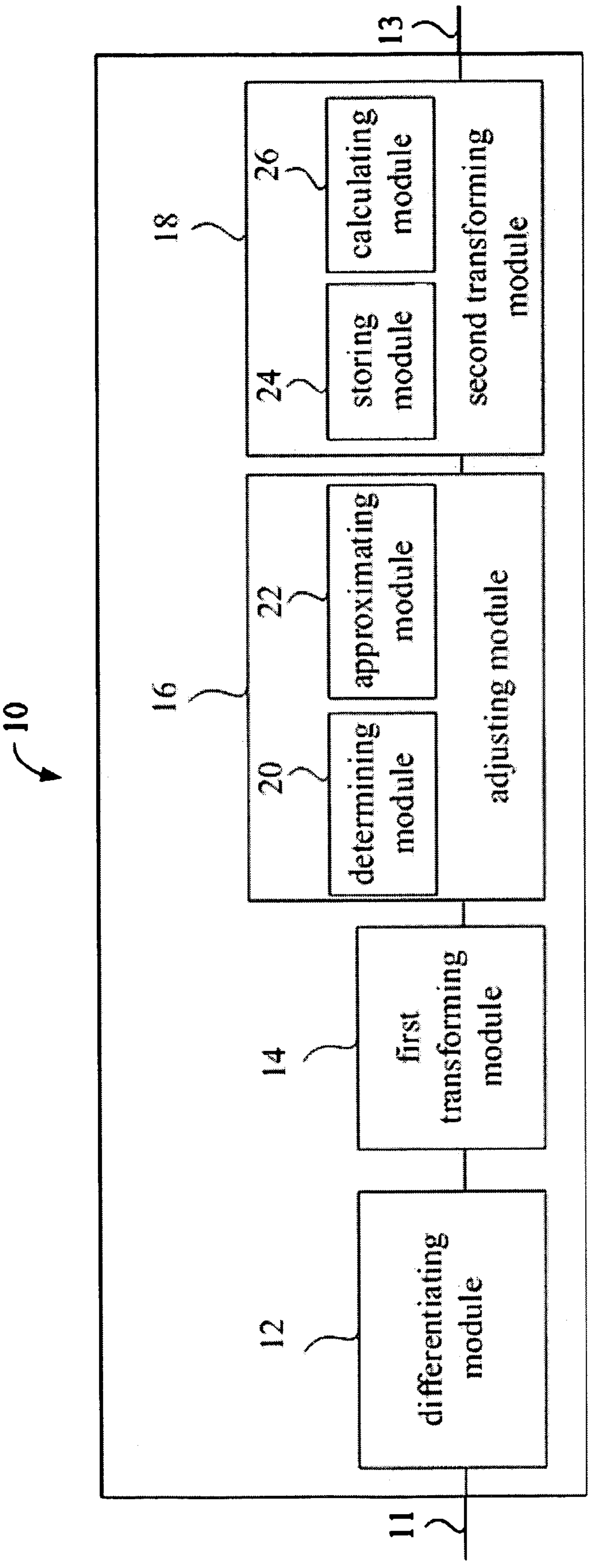
FIG. 1 is a functional block diagram illustrating the transforming apparatus of the invention.
Figure 2:
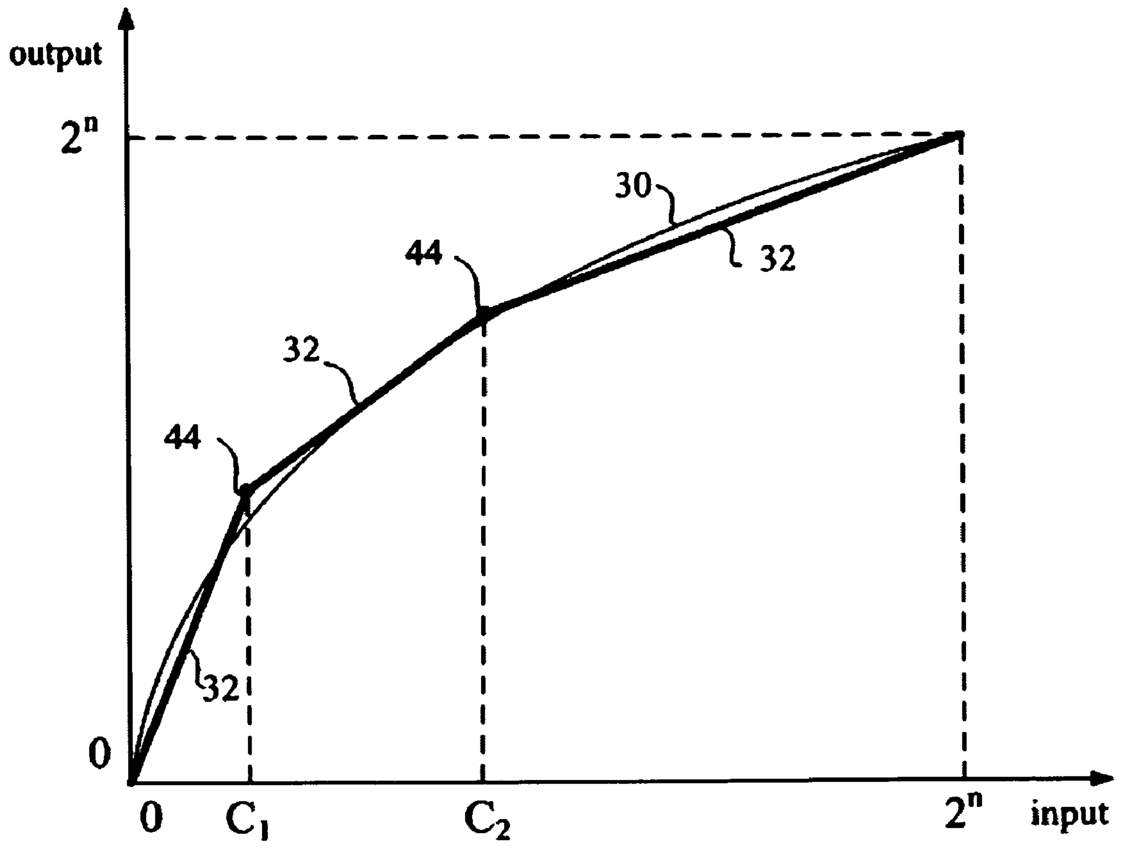
FIG. 2 is a schematic diagram illustrating the transforming curve and a plurality of approximate lines of the invention.

Referring to FIG. 1 and FIG. 2, FIG. 1 is a functional block diagram illustrating the transforming apparatus 10 of the invention. FIG. 2 is a schematic diagram illustrating the transforming curve 30 and a plurality of approximate lines 32 of the invention. As shown in FIG. 1 and FIG. 2, according to the transforming curve 30, the transforming apparatus 10 of the invention is used for transforming a first image 11 into a second image 13, wherein the first image 11 includes a plurality of pixels, and the transforming apparatus 10 includes a differentiating module 12, a first transforming module 14, an adjusting module 16 and a second transforming module 18.

The differentiating module 12, according to a predetermined value, is used for transforming the transforming curve 30 into a plurality of sub-curves. For example, the predetermined value is the number of the sub-curves. The first transforming module 14 is used for generating a plurality of straight lines corresponding to the sub-curves. According to the sub-curves, the straight lines and a predetermined threshold, the adjusting module 16 is used for adjusting the straight lines to generate a plurality of approximate lines 32.

Each of the approximate lines is represented by:

$y=A_i*x_i+B_i$, wherein $x_i$ represents the brightness of a first pixel of the pixels, $B_i$ represents an offset of the i-th approximate line corresponding to a y-axis. $A_i$ includes at least one summation of $2^j$, i is a natural number, and j is an integer. In this embodiment, since $A_i$ includes at least one summation of $2^j$, the circuitry of $y=A_i*x_i+B_i$,can be achieved by simple shifters and adders.

Figure 3:
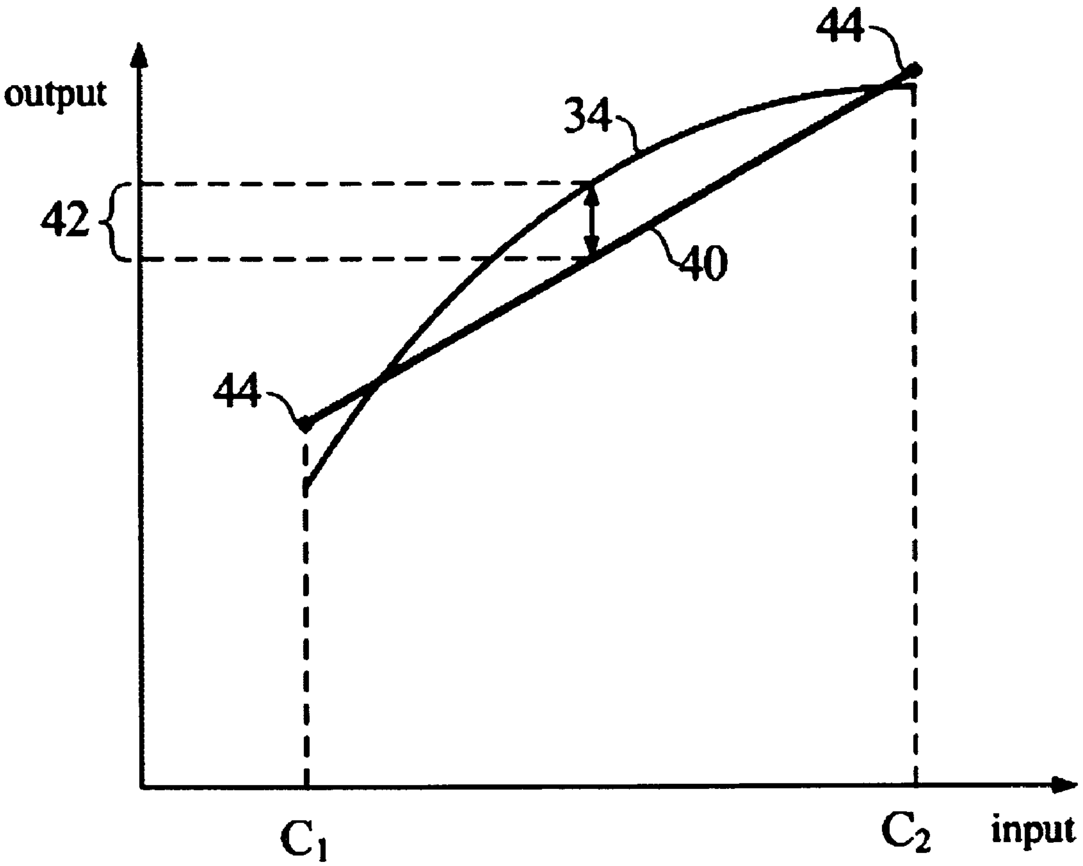
FIG. 3 is a schematic diagram illustrating how the determining module of the transforming apparatus determines a maximum range.

Referring to FIGS. 1 through 3, FIG. 3 is a schematic diagram illustrating how the determining module 20 of the transforming apparatus 10 determines a maximum range. The adjusting module 16 includes a determining module 20 and an approximating module 22. As shown in FIG. 3, the determining module 20 compares the predetermined threshold with a first sub-curve 34 of the sub-curves and a first straight line 40 of the straight lines to determine a maximum range 42, so as to generate a transforming parameter. The predetermined threshold can be the threshold of the error between the images transformed by sub-curves and the corresponding straight lines, or the threshold of the error between the sub-curves and the corresponding straight lines. According to the transforming parameter, the approximating module 22 transforms the first straight line into a first approximate line of the approximate lines 32, correspondingly. The approximating module 22 can adjust a set of nodes 44 relative to the first straight line 40 to generate the first approximate line.

In this embodiment, the approximating module 22 readjusts a set of nodes 44 relative to the first straight line 40 to generate the first approximate line, such that the first approximate line will approximate the first sub-curve 34. Then, when the first sub-curve 34 is replaced by the first approximate line to perform image transformation, the error will be reduced. In another embodiment, the approximating module 22 can reselect a set of nodes 44 relative to the first straight line 40 to generate one new first approximate line. The objective of the aforementioned embodiments is to adjust the first approximate line to approximate the first sub-curve 34, so as to increase the accuracy of image transformation.

According to the approximate lines and the pixels of the first image 11, the second transforming module 18 is used for generating the second image 13. The second transforming module 18 includes a storage module 24 and a calculating module 26. The storage module 24 is used for storing each $A_i$ and $B_i$ of the approximate lines. According to each $A_i$ and $B_i$ of the approximate lines and the pixels, the calculating module 26 is used for generating the second image 13.

Figure 4:
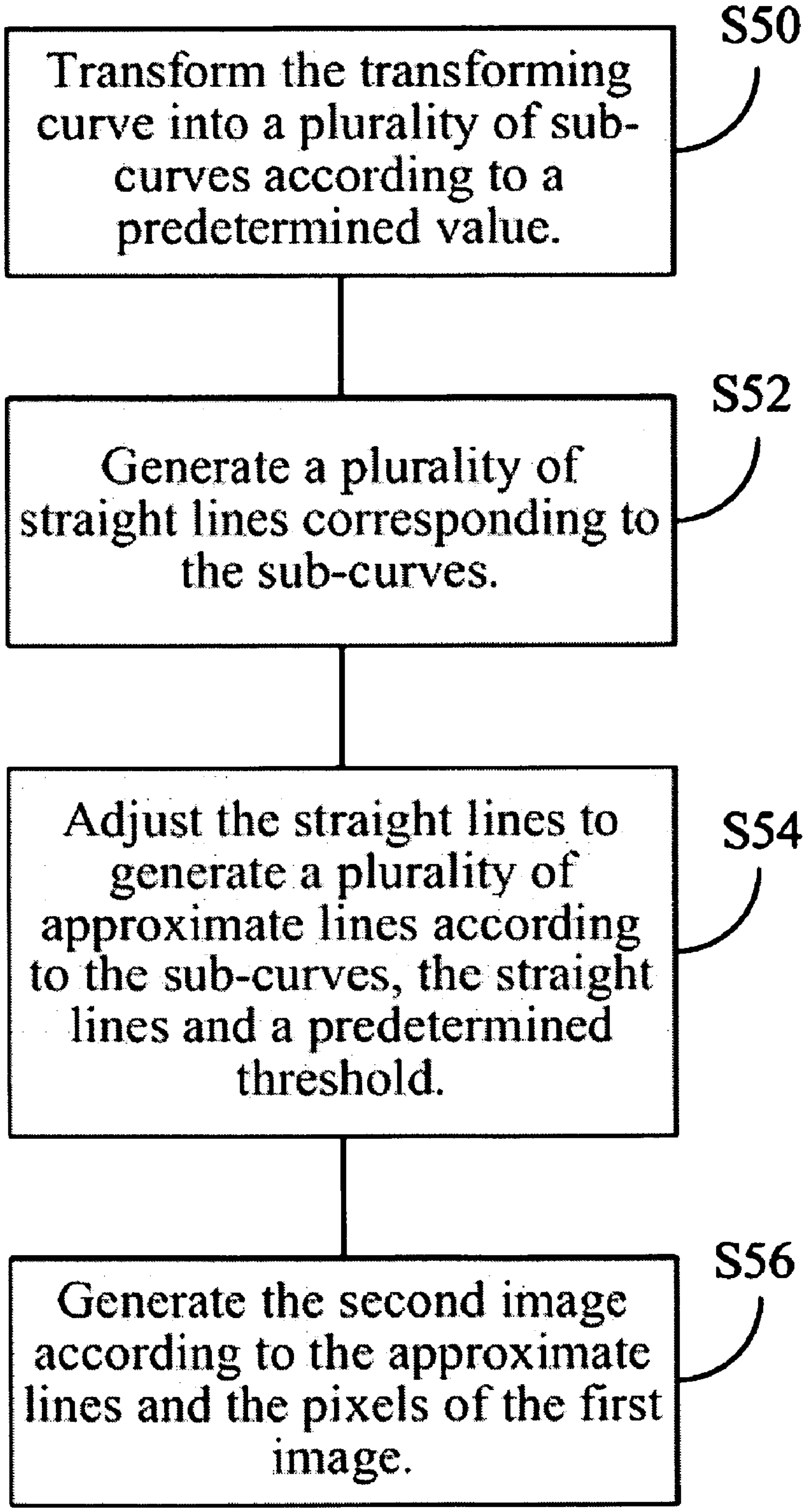
FIG. 4 is a flowchart showing the transforming method of the invention.

Referring to FIG. 4, FIG. 4 is a flowchart showing the transforming method of the invention. As shown in FIG. 4, the transforming method, according to a transforming curve, is used for transforming a first image into a second image, wherein the first image includes a plurality of pixels. The transforming method includes the following steps. At start, step S50 is performed to transform the transforming curve into a plurality of sub-curves according to a predetermined value. The predetermined value can be the number of the sub-curves. Afterward, step S52 is then performed to generate a plurality of straight lines corresponding to the sub-curves. Step S54 is then performed to adjust the straight lines to generate a plurality of approximate lines according to the sub-curves, the straight lines and a predetermined threshold. Step S56 is then performed to generate the second image according to the approximate lines and the pixels of the first image.

Each of the approximate lines is represented by:

$y=A_i*x_i+B_i$, wherein $x_i$ represents the brightness of a first pixel of the pixels, $B_i$ represents an offset of the i-th approximate line corresponding to a y-axis. $A_i$ comprises at least one summation of $2^j$, i is a natural number, and j is an integer.

Figure 5:
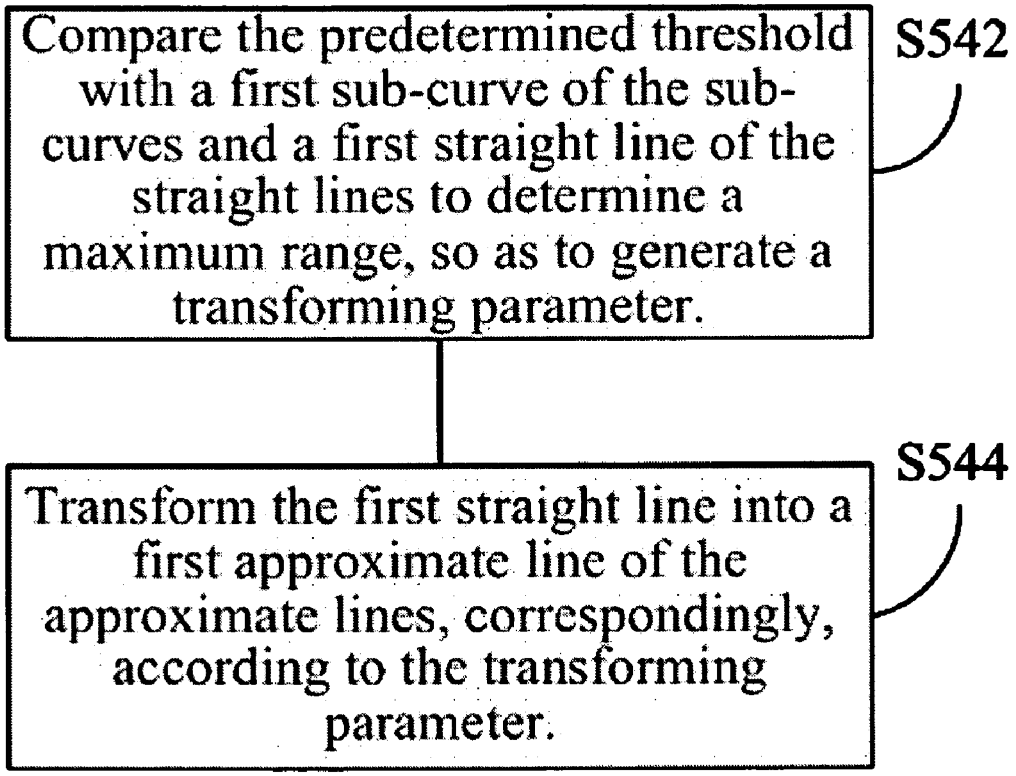
FIG. 5 is a flowchart showing how the transforming method of the invention generates a plurality of approximate lines.

Referring to FIG. 5, FIG. 5 is a flowchart showing how the transforming method of the invention generates a plurality of approximate lines. As shown in FIG. 5, step S54 further includes the following steps. Step S542 is performed to compare the predetermined threshold with a first sub-curve of the sub-curves and a first straight line of the straight lines to determine a maximum range, so as to generate a transforming parameter. The predetermined threshold can be the threshold of the error between the images transformed by sub-curves and the corresponding straight lines, or the threshold of the error between the sub-curves and the corresponding straight lines. Step S544 is then performed to transform the first straight line into a first approximate line of the approximate lines, correspondingly, according to the transforming parameter. In the step S544, a set of nodes relative to the first straight line is adjusted to generate the first approximate line.

Figure 6:
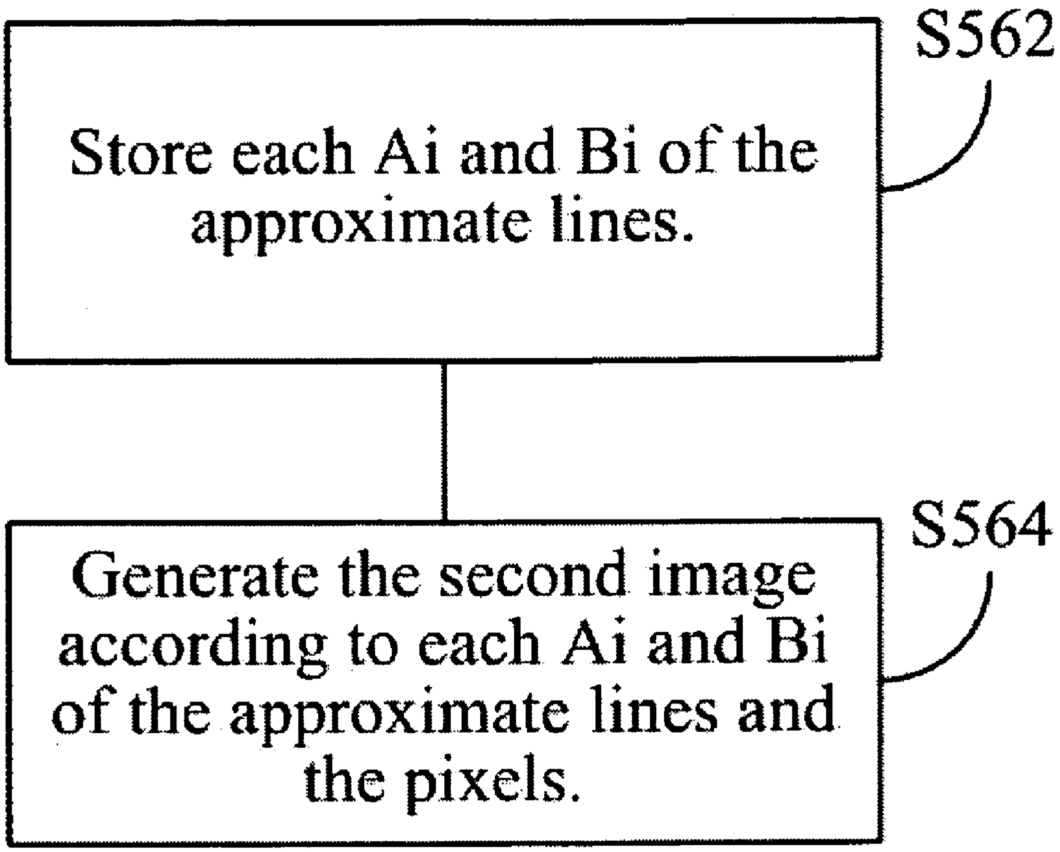
FIG. 6 is a flowchart showing how the transforming method of the invention generates the second image.

Referring to FIG. 6, FIG. 6 is a flowchart showing how the transforming method of the invention generates the second image. As shown in FIG. 6, the step S56 further includes the following steps. Step S562 is performed to store each $A_i$ and $B_i$ of the approximate lines. Step S564 is then performed to generate the second image according to each $A_i$ and $B_i$ of the approximate lines and the pixels.

According to the aforementioned apparatus and method thereof, the invention can adjust $2^{nd}$-order curve into $1^{st}$-order line and further utilize the lines to transform one image into another. The $2^{nd}$-order calculation circuit has to be performed by multipliers, but the invention just only needs simple shifters and adders to perform $1^{st}$-order calculation. Therefore, the calculation time is saved, the circuit architecture is simpler, and the cost is reduced.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A transforming apparatus, according to a transforming curve, for transforming a first image into a second image, the first image comprising a plurality of pixels, the transforming apparatus comprising:

- a differentiating module, according to a predetermined value, for transforming the transforming curve into a plurality of sub-curves;
- a first transforming module for generating a plurality of straight lines corresponding to the sub-curves;
- an adjusting module, according to the sub-curves, the straight lines and a predetermined threshold, for adjusting the straight lines to generate a plurality of approximate lines, the adjusting module comprising:
  - a determining module for comparing the predetermined threshold with a first sub-curve of the sub-curves and a first straight line of the straight lines to determine a maximum range, so as to generate a transforming parameter; and
  - an approximating module, according to the transforming parameter, for transforming the first straight line into a first approximate line of the anproximate lines, correspondingly; and
- a second transforming module, according to the approximate lines and the pixels of the first image, for generating the second image.

2. The transforming apparatus of claim 1, wherein each of the approximate lines is represented by:

$y_i=A_i*x_i+B_i$, wherein $x_i$ represents an input brightness of a first pixel of the pixels, $y_i$ represents an output brightness of the first pixel of the pixels, $B_i$ represents an offset of the i-th approximate line corresponding to a y-axis, $A_i$ represents a slope of the i-th approximate line and comprises at least one summation of $2^j$, i is a natural number, and j is an integer.

3. The transforming apparatus of claim 2, wherein the second transforming module comprises:

a storage module for storing each $A_i$ and $B_i$ of the approximate lines; and a calculating module, according to each $A_i$ and $B_i$ of the approximate lines and the pixels, for generating the second image.

4. The transforming apparatus of claim 1, wherein the approximating module adjusts a set of nodes relative to the first straight line to generate the first approximate line.

5. A transforming method, according to a transforming curve, for transforming a first image into a second image, the first image comprising a plurality of pixels, the transforming method comprising the steps of:

(a) transforming the transforming curve into a plurality of sub-curves according to a predetermined value;

(b) generating a plurality of straight lines corresponding to the sub-curves;

(c) adjusting the straight lines to generate a plurality of approximate lines according to the sub-curves, the straight lines and a predetermined threshold, wherein step (c) comprises the steps of:

(c1) comparing the predetermined threshold with a first sub-curve of the sub-curves and a first straight line of the straight lines to determine a maximum range, so as to generate a transforming parameter; and (c2) transforming the first straight line into a first approximate line of the approximate lines, correspondingly, according to the transforming parameter; and (d) generating the second image according to the approximate lines and the pixels of the first image.

6. The transforming method of claim 5, wherein each of the approximate lines is represented by:

$y_i=A_i*x_i+B_i$, wherein $x_i$ represents an input brightness of a first pixel of the pixels, $y_i$ represents an output brightness of the first pixel of the pixels, $B_i$ represents an offset of the i-th approximate line corresponding to a y-axis, $A_i$ represents a slope of the i-th approximate line and comprises at least one summation of $2^j$, i is a natural number, and j is an integer.

7. The transforming method of claim 6, wherein the step (d) comprises the steps of:

(d1) storing each $A_i$ and $B_i$ of the approximate lines; and (d2) generating the second image according to each $A_i$ and $B_i$ of the approximate lines and the pixels.

8. The transforming method of claim 5, wherein in the step (c2), a set of nodes relative to the first straight line is adjusted to generate the first approximate line.

* * * * *